March 25, 1952 A. L. W. WILLIAMS 2,590,665

STOPPING DEVICE FOR TAPE IN MAGNETIC RECORDERS

Filed March 24, 1950 2 SHEETS—SHEET 1

INVENTOR.
ALFRED L. W. WILLIAMS
BY Harry C. Page
ATTORNEY

*INVENTOR.*
ALFRED L. W. WILLIAMS
*BY* Harry C. Page
ATTORNEY

Patented Mar. 25, 1952

2,590,665

UNITED STATES PATENT OFFICE 2,590,665

STOPPING DEVICE FOR TAPE IN MAGNETIC RECORDERS

Alfred L. W. Williams, Cleveland Heights, Ohio, assignor to The Brush Development Company, Cleveland, Ohio, a corporation of Ohio Application March 24, 1950, Serial No. 151,595

8 Claims. (Cl. 271—2.4)

The present invention is directed to an improved device for stopping a magnetic recorder and particularly to such a device for stopping a magnetic tape recorder in which the tape is driven by a capstan during the recording or reproducing operation.

A number of commercially available recording and reproducing machines depend upon a residual magnetization effect in order to provide a recording. The record member of such machines may take a variety of forms but one of the most popular of such devices utilizes a record member having a tape-like base material of paper or plastic and having superimposed thereon a thin layer of magnetic material such as a black iron oxide. Also, it is the common practice, in many of the machines of this type, to provide a constant-speed driving capstan against which the tape is pressed during the recording or reproducing operation in order to assure that the tape moves at a substantially constant speed regardless of the amount of record material upon the supply reel or upon the take-up reel. When such a capstan drive is utilized, it is necessary to make some provision for preventing the tape being supplied to the capstan faster than it is moved onward by the capstan in order to prevent a piling up of the tape between the supply reel and the capstan. Also, in such arrangements, it is necessary to provide some means for causing the take-up reel always to take up all of the slack in the tape after it passes the capstan or else a tangle of tape will result. It is the common practice, therefore, to overdrive the take-up reel through a clutch which has some slippage and to drive the supply reel in the reverse direction through a similar slippage device. In some cases, the reverse drive on the supply reel is omitted and a friction arrangement of some kind is provided to prevent over-running of the supply reel and to prevent the tape from being removed therefrom at a faster rate than it is being driven by the capstan.

In any event, in arrangements of the type under consideration, a considerable number of rotating or moving parts are necessary and this, in turn, renders it difficult to start and stop the tape quickly during a recording or reproducing operation. Since these machines are frequently used for dictating and analogous purposes, it is often very desirable to provide an arrangement for quickly stopping and starting the tape. If this is done by a brute force method as, for example, by de-energizing the motor or by applying a braking action to the motor or some other part of the rotating system, the time of starting and stopping is very much higher than ordinarily desired. Furthermore, attempts to shorten this time by increasing the forces tending to stop the machine usually result in stresses at some point in the drive system which are sufficient to break the tape.

Applicant has provided a very much improved arrangement for stopping the tape by the use of a device which acts upon the tape in the immediate vicinity of the capstan in such a manner that only the inertia of a minimum number of parts is involved in the braking action. Specifically, applicant provides a starting and stopping arrangement wherein only the inertia associated with a slight movement of a roller pressing the tape against the capstan is involved and the remainder of the entire tape-driving mechanism of the machine is not involved as these parts continue to operate even while the tape is stopped. This provides a positive and very fast starting and stopping action and is ideal for dictating purposes inasmuch as, by the use of the device, the operator can start and stop the machine at a rate sufficiently fast to permit listening to a single word in the reproduction and thereafter erasing the word and inserting a substitute word in the record.

It is an object of the present invention, therefore, to provide an improved starting and stopping device for a magnetic recorder.

It is a further object of the invention to provide a starting and stopping device for a magnetic recorder in which the inertia effects of the drive system are reduced to a minimum insofar as their action upon the starting and stopping device is concerned.

It is a further object of the invention to provide an improved starting and stopping device for a magnetic recording and reproducing device and which is suitable for dictating purposes.

In accordance with the invention there is provided in a magnetic record device, wherein the record member comprises a flexible ribbon, a stopping and starting arrangement comprising a driven cylindrical capstan and a resiliently biased pressure element for pressing the record member against the capstan to drive the record member during a transducing operation. Further a rotatable element which is a circumferential portion of a cylinder is provided around the capstan which is movable to two positions and which, in the first of the two positions, permits the record member to be pressed against the capstan by the pressure element during a transducing operation and which, in the second position thereof, causes a portion of said circumferential cylinder portion first to press the record member against the pressure element and thereafter to reduce the pressure of the pressure element against the capstan and stop the record member. Additionally, means are provided for selectively moving the rotatable element to either of the two above-mentioned positions.

For a better understanding of the invention together with other and further objects thereof, reference is had to the following description taken in connection with the accompanying drawings and its scope will be pointed out in the appended claims.

Fig. 1 of the drawing comprises an illustration of the starting and stopping device of the invention in its relationship to other portions of a magnetic tape recorder;

Figure 1:
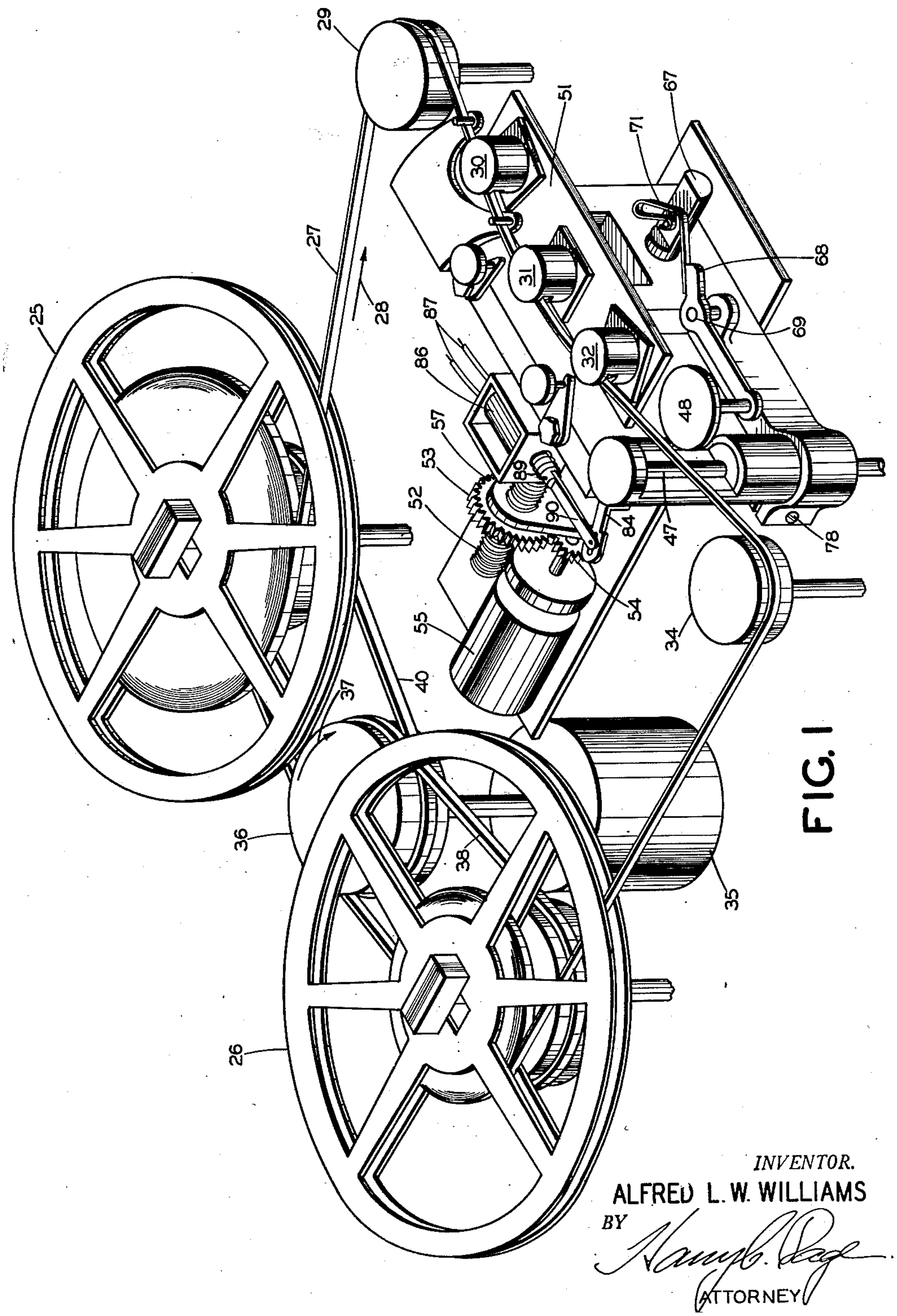

Referring now more particularly to Fig. 1, there is illustrated some of the essential features of a driving system which may be used in a preferred embodiment of the invention, together with the relationship of the starting and stopping device of the invention to the illustrated driving system. The complete mechanism of the tape recorder is not shown in Fig. 1, inasmuch as only those parts have been illustrated which are considered necessary to a complete understanding of the invention. The drive system illustrated is, however, generally similar to that shown in application Serial No. 92,378, filed on May 6, 1949, in the names of Henry J. Harsant and Theodore F. Deucher.

The mechanical portion of the magnetic recording and reproducing device illustrated in Fig. 1 comprises two reels 25 and 26 mounted in spaced-apart relationship with a length of the magnetic record member, such as a tape 27, extending from one reel to the other. As illustrated, reel 25 is the supply reel and reel 26 is the take-up reel as the record material moves in the direction shown by the arrow 28 during the recording or reproducing of a program. The record material, in its path between the supply and take-up reels, passes around a first or upper idler roller 29, a series of transducers such as an obliterating head 30, a recording head 31, and a reproducing head 32. The record member then passes a driven capstan 47 and a second idler roller 34 and thereafter is taken up by the reel 26.

Means are provided for driving the supply and take-up reels. The drive means illustrated comprises a motor 35 connected to a fly wheel 36 which rotates only in the direction of arrow 37. A belt 38 connects the fly wheel 36 to the reel 26 through a suitable slip clutch arrangement (not shown in detail) and a belt 40 connects the fly wheel 36 to the reel 25 through a suitable slip clutch arrangement (also not shown in detail). The belts 38 and 40 are so arranged, and the magnetic rceord member 27 is so connected to the reels 25 and 26, that both reels at all times during the operation of the device tend to wind up the record member 27 during the recording or reproducing action. A second motor (not shown) is provided for driving the capstan 47. The capstan

47 is adapted to be coupled to the record member at a location between the heads 30, 31 and 32 and the take-up reel 26. A pressure element 48 is provided for pressing the record member 27 against the capstan 47 in order to drive the record member during a transducing operation. In the position illustrated in Fig. 1, the pressure element 48 is not pressed against the capstan and the tape is not being driven. When the element 48 is pressed against the capstan 47, the driven capstan 47 pulls the record member by the transducer heads.

Take-up reel 26 is coupled to the motor 35 through a slip clutch which is sufficiently strong, and the speed of motor 35 is such that the take-up reel 26 winds up all of the record member which the capstan 47 pulls by the transducer heads. It is preferable that the reel 26 tends to take up the record material at a slightly greater rate than that at which the capstan pulls the record member by the transducer heads. The supply reel 25 is coupled to the motor 35 through a rather weak slip clutch so that the record member is pulled from the reel 25 by the capstan 47 in spite of the fact that reel 25 is tending to wind up the record member in the reverse direction.

In order to cause the pressure element 48 to move against the tape during a transducing operation, it is connected to a shaft 67 which may be reciprocated by means of a lead screw 52 operating in a threaded bracket 57. The lead screw 52, in turn, is driven by a suitable gear train 53, 54, and a motor 55. A spring 71, connected to the arm 67, contacts one end of a lever 68 which is pivoted at the point 69 and upon the other end of which pressure element 48 is mounted. As the finger 67 is driven forward by the motor 55, the arm 68 pivots about the point 69 until the pressure element 48 engages the tape 27 at the location of the capstan 47. As the finger 67 continues to be driven forward the spring 71 bends as the arm 68 cannot pivot any further due to the wheel 48 being against the tape 27 which is backed by the capstan 47. This establishes a strong spring bias continually urging the pressure element 48 against the capstan 47 with the tape 27 pinched therebetween during a transducing operation.

Figure 2:
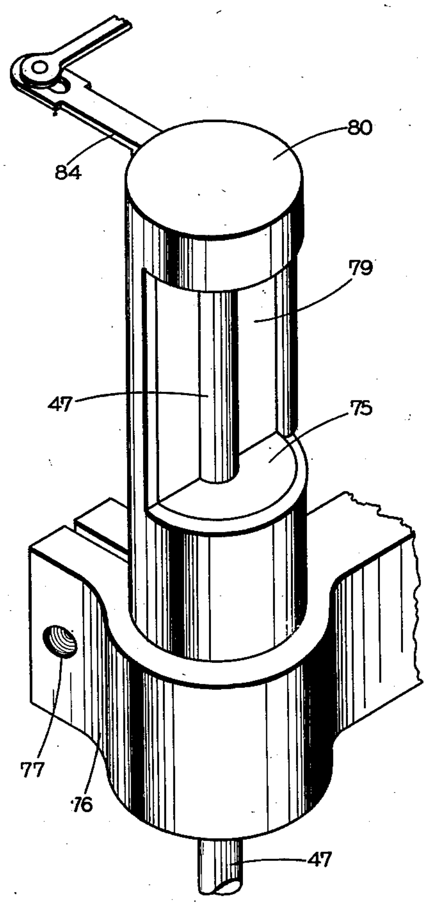
Fig. 2 illustrates the general assembly of the starting and stopping device of Fig. 1.
Figure 3:
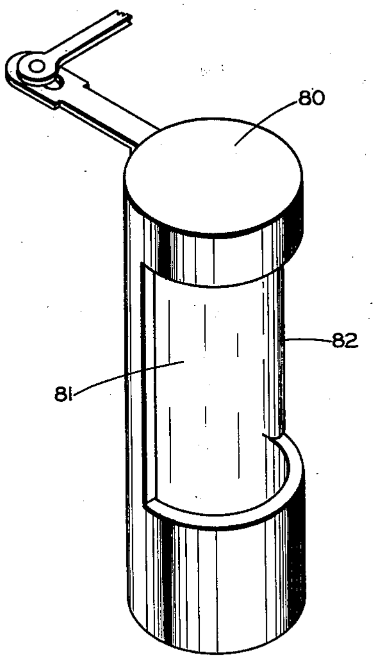
Fig. 3 shows in detail the construction of a portion of the arrangement of Fig. 2.

A portion of the capstan assembly is illustrated in detail in Fig. 2. This assembly comprises a cylindrical bearing 75 for the capstan which is held in a bracket 76 by means of a screw in the tapped hole 77, as illustrated by numeral 78 of Fig. 1. The capstan is contained in a central portion in the bearing 75 and a portion of the bearing is removed as illustrated at 79 in order to provide a window in the bearing and expose the capstan thereby allowing the pressure member 48 of Fig. 1 to press the tape against the capstan 47 under certain operating conditions. The stopping device of the invention comprises a cap member 80 which fits over the top of the cylindrical bearing 75 and which also has a window therein to permit the tape to make contact with the capstan for transducing operations. This cylindrical cap is illustrated in more detail in Fig. 3 and a portion of the material which is cut away in order to provide the window 81 is turned back upon the outside surface of the cap member 80 thereby to provide a boundary 82 of the window 81 which is effective, upon rotation of the cap 80, to stop the tape in a method which will be described in more detail hereinafter.

An arm 84 is provided which is attached to cap 80 in order to provide an arrangement for moving the cap 80 to two positions in one position of which the tape is caused to be driven by the capstan member 47 and in another position of which the boundary portion 82 of cap 80 is effective first to press the record member against the pressure element 48 of Fig. 1 and thereafter to reduce the pressure of the pressure element 48 against the capstan and stop the record member. As illustrated in Fig. 1, a solenoid 86 is adapted when energized through leads 87 to move the lever 84 by means of connecting link 90 and thereby stop the tape. When the solenoid 86 is de-energized, a spring 89 causes the arm 84 to return to its original position and thereby again allows the tape to make contact with the capstan 47 and to be driven for transducing purposes.

It will be seen that in Fig. 1 the tape 27 is not being pressed against the capstan 47 by the rotatable pressure element 48. Therefore, this represents a condition of operation in which the machine is not being used or at least in which it is not being used for a transducing operation. In some cases it is customary to effect high-speed winding and rewinding by a direct use of the motor 35 and without any utilization of the capstan 47 and, under these conditions, the roller 48 does not press the tape against the capstan.

Figures 4, 5:
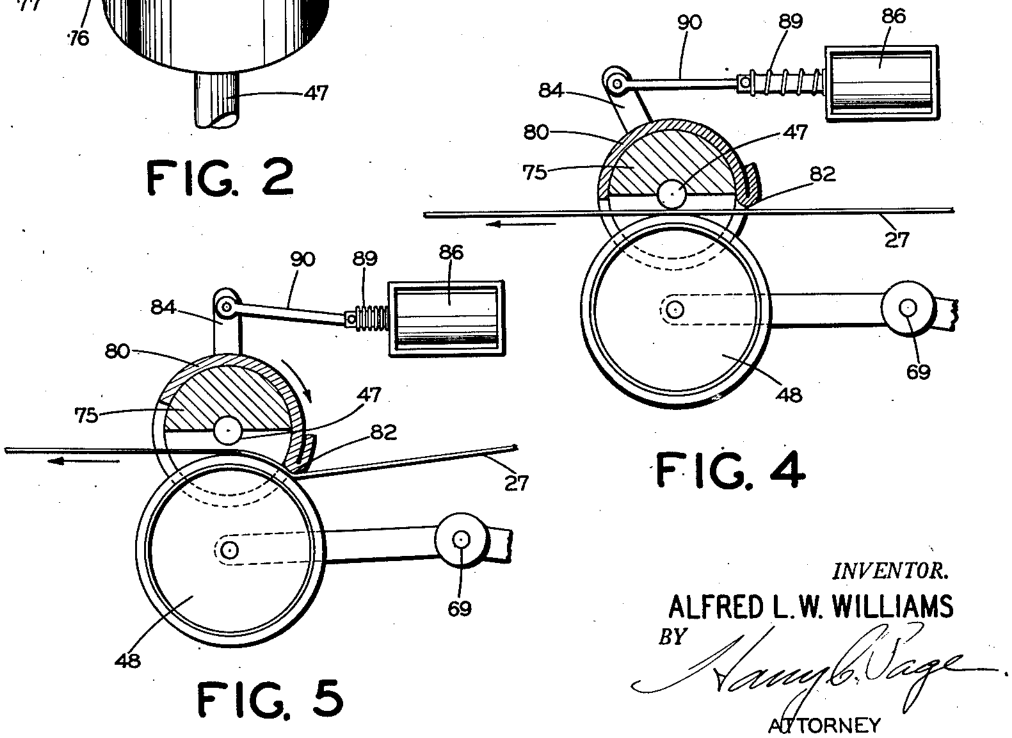
Figs. 4 and 5 illustrate, respectively, the relative position of parts directly associated with the starting and stopping device under the conditions where the tape is being driven and under the conditions where the tape has been brought to rest by the starting and stopping device.

In Fig. 4 there is shown the relative position of certain of the elements when the tape 27 is being pressed against the capstan 47 by the pressure roller 48 and this, therefore, represents the condition under which a record is being made or under which a record is being reproduced by the machine. It will be seen that the boundary portion 82 of cap 80 is not pressing against the tape 27 in the arrangement illustrated in Fig. 4.

In Fig. 5, the position of the various elements after solenoid 86 has been energized to stop the tape is illustrated. It will be seen that the cap 80 has now been rotated so that the boundary portion 82 of the cap has removed the pressure roller 48 from the capstan 47. Upon de-energization of the solenoid 86, the apparatus will return to the position illustrated in Fig. 4.

It will be seen, therefore, that the arrangement described comprises a driven cylindrical capstan 47 and a pressure element 48 for pressing the record member 27 against the capstan 47 to drive the record member during a transducing operation. It will also be seen that the cap 80 comprises a rotatable element around the capstan movable to two positions and having an opening 81 therein which, in the first of the two positions as illustrated by Fig. 4, permits the record member 27 to be pressed against the capstan 47 by the pressure element 48 during a transducing operation. In moving to the second position, illustrated by the arrangement of Fig. 5, the boundary 82 of the open portion of the cap 80 is caused first to press the record member 27 against the pressure element 48 and thereafter to reduce the pressure of the pressure element 48 against the capstan 47 and stop the record member. The solenoid 86 comprises a means for moving the rotatable element 80 into either of the two positions mentioned above.

While there has been described what is at present considered to be the preferred embodiment of the invention, it will be obvious to those skilled in the art that various changes and modifications may be made therein without departing from the invention and it is aimed in the appended claims to cover all such changes and modifications as fall within the true spirit and scope of the invention.

What is claimed is:

1. In a magnetic record device wherein the record member comprises a flexible ribbon, a stopping and starting arrangement comprising: a driven cylindrical capstan; a resiliently biased pressure element for pressing said record member against said capstan to drive said record member during a transducing operation; a rotatable element which is a circumferential portion of a cylinder around said capstan movable to two positions which, in the first of said two positions, permits said record member to be pressed against said capstan by said pressure element during said transducing operation and which, in the second position thereof, causes a portion of said circumferential cylinder portion first to press the record member against said pressure element and thereafter to reduce the pressure of said pressure element against said capstan and stop said record member; and means for selectively moving said rotatable element to either of said two positions.

2. In a magnetic record device wherein the record member comprises a flexible ribbon, a stopping and starting arrangement comprising: a driven cylindrical capstan; a resiliently biased rotatable pressure element for pressing said record member against said capstan to drive said record member during a transducing operation; a rotatable element which is a circumferential portion of a cylinder around said capstan movable to two positions which, in the first of said two positions, permits said record member to be pressed against said capstan by said pressure element during said transducing operation and which, in the second position thereof, causes a portion of said circumferential cylinder portion first to press the record member against said pressure element and thereafter to reduce the pressure of said pressure element against said capstan and stop said record member; and means for selectively moving said rotatable element to either of said two positions.

3. In a magnetic record device wherein the record member comprises a flexible ribbon, a stopping and starting arrangement comprising: a driven cylindrical capstan; a resiliently biased cylindrical rotatable pressure element having a diameter many times greater than said capstan for pressing said record member against said capstan to drive said record member during a transducing operation; a rotatable element which is a circumferential portion of a cylinder around said capstan movable to two positions which, in the first of said two positions, permits said record member to be pressed against said capstan by said pressure element during said transducing operation and which, in the second position thereof, causes a portion of said circumferential cylinder portion first to press the record member against said pressure element and thereafter to reduce the pressure of said pressure element against said capstan and stop said record member; and means for selectively moving said rotatable element to either of said two positions.

4. In a magnetic record device wherein the record member comprises a flexible ribbon, a stopping and starting arrangement comprising: a driven cylindrical capstan; a spring biased pressure element for pressing said record member against said capstan to drive said record member during a transducing operation; a rotatable element which is a circumferential portion of a cylinder around said capstan movable to two positions which, in the first of said two positions, permits said record member to be pressed against said capstan by said pressure element during said transducing operation and which, in the second position thereof, causes a portion of said circumferential cylinder portion first to press the record member against said pressure element and thereafter to reduce the pressure of said pressure element against said capstan and stop said record member; and means for selectively moving said rotatable element to either of said two positions.

5. In a magnetic record device wherein the record member comprises a flexible ribbon, a stopping and starting arrangement comprising: a driven cylindrical capstan; a bearing around said capstan having a window therein to permit said ribbon being pressed against said capstan to drive said record member during a transducing operation; a resiliently biased pressure element for pressing said member against said capstan through said window to drive said record member during a transducing operation; a rotatable element which is a circumferential portion of a cylinder around said capstan movable to two positions which, in the first of said two positions, permits said record member to be pressed through said window against said capstan by said pressure element during said transducing operation and which, in the second position thereof, causes a portion of said circumferential cylinder portion first to press the record member against said pressure element and thereafter to reduce the pressure of said pressure element against said capstan and stop said record member; and means for selectively moving said rotatable element to either of said two positions.

6. In a magnetic record device wherein the record member comprises a flexible ribbon, a stopping and starting arrangement comprising: a driven cylindrical capstan; a resiliently biased pressure element for pressing said record member against said capstan to drive said record member during a transducing operation; a rotatable element which is a circumferential portion of a cylinder around said capstan movable to two positions which, in the first of said two positions, permits said record member to be pressured against said capstan by said pressure element during said transducing operation and which, in the second position thereof, causes a portion of said circumferential cylinder portion first to press the record member against said pressure element and thereafter to reduce the pressure of said pressure element against said capstan and stop said record member; and toggle means for selectively moving said rotatable element to either of said two positions.

7. In a magnetic record device wherein the record member comprises a flexible ribbon, a stopping and starting arrangement comprising: a driven cylindrical capstan; a resiliently biased pressure element for pressing said record member against said capstan to drive said record member during a transducing operation; a rotatable element which is a circumferential portion of a cylinder around said capstan movable to two positions which, in the first of said two positions, permits said record member to be pressed against said capstan by said pressure element during said transducing operation and which, in the second position thereof, causes a portion of said circumferential cylinder portion first to press the record member against said pressure element and thereafter to reduce the pressure of said pressure element against said capstan and stop said record member; and solenoid means for selectively moving said rotatable element to either of said two positions.

8. In a magnetic recording device wherein the record member comprises a flexible ribbon, a starting and stopping arrangement comprising: a driven cylindrical capstan; a resiliently biased pressure element for pressing said record member against said capstan to drive said record member in a given direction during a transducing operation; a rotatable element which is a circumferential portion of a cylinder around said capstan movable to two positions which, in the first of said two positions, permits said record member to be pressed against said capstan by said pressure element during said transducing operation and which, in the second position thereof, causes a portion of said circumferential cylinder portion first to press a portion of the record member against said pressure element before said portion arrives at said capstan in said transducing operation and thereafter to reduce the pressure of said pressure element against said capstan and stop said record member; and means for selectively moving said rotatable element to either of said two positions.

ALFRED L. W. WILLIAMS.

REFERENCES CITED

The following references are of record in the file of this patent:

UNITED STATES PATENTS

| Number | Name | Date |
|---|---|---|
| 1,193,045 | Niles | Aug. 1, 1916 |
| 1,993,735 | Foster et al. | Mar. 12, 1935 |
| 2,273,024 | De Vry | Feb. 17, 1942 |